UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

PLASTIC COMPOSITION AND METHOD OF MAKING SAME.

1,175,425.  Specification of Letters Patent.  Patented Mar. 14, 1916.

No Drawing.  Application filed November 25, 1913. Serial No. 803,047.

*To all whom it may concern:*

Be it known that I, WALTER K. FREEMAN, a citizen of the United States, residing at Oscawana, in the county of Westchester and State of New York, have invented certain new and useful Improvements in Plastic Compositions and Methods of Making Same; and I do hereby declare the following to be a full, clear, and exact description of the invention, such as will enable others skilled in the art to make and use the same.

My invention relates to composition articles and the method of making the same, and more particularly to hard smooth articles such as billiard balls, brush and mirror backs, knife handles and the like.

The object of my invention is to produce highly satisfactory articles of the general character mentioned, at less cost than such articles can now be manufactured. Articles made in accordance with my invention are noncombustible and have the proper degree of hardness, brilliancy and elasticity to be used for many purposes for which ivory, bone and celluloid articles are now used, and in making such articles I utilize the wood derivatives recovered from the sulfite waste liquor of wood pulp mills.

In my co-pending application Serial Number 803,044, filed on even date herewith, I have described a method of recovering from the sulfite waste liquor of wood pulp mills, the wood derivatives and also the sulfurous acid and calcium constituents in the form of substantially neutral inert substances, and I have used the word "xylium" to designate broadly the substantially neutralized inert recovered product whether in a syrupy or anhydrous state. It was pointed out in that application that if the wood derivatives were to be recovered and separated from the sufurous acid and calcium constituents of the liquor, the liquor was first treated with a chloridic reagent as sodium chlorid and then treated with a suitable precipitant such as barium chlorid to effect precipitation of the sulfur and calcium compounds of the liquor, after which the syrupy mass containing the wood derivatives of the liquor was drawn off from the precipitate and then bleached if desired, and evaporated down to a coherent mass and ground into powder. I termed this recovered substance containing the wood derivatives separated from the precipitates, whether in the syrupy or powdered state, "xylozo." It was also pointed out that if the wood derivatives and neutralized sulfurous acid and calcium ingredients were to remain unseparated in the neutralized mixture, the mixture could be treated so as to effect precipitation of the sulfur calcium compounds, or it could be treated in such a way as to simply convert such compounds into inert substances suspended through the mass, as may be desired; and I termed this resulting mixture, whether in the syrupy or coherent state, "xylosca."

In this specification, I will use the terms "xylium," "xylosca" and "xylozo" in the sense stated, to designate the neutralized products recovered from the sulfite waste liquor.

In order that those skilled in the art may thoroughly understand my invention and the method of carrying out the same, I will describe in detail what I believe to be the best method now known to me of making my new composition articles.

I first take a suitable amount of finely disintegrated wood known as wood flour and thoroughly bleach after which it is treated with a suitable pure metallic oxy-chlorid preferably magnesium oxy-chlorid to harden it. The hardening of the wood flour is preferably effected by thoroughly wetting it with a solution of magnesium chlorid, about 15 degrees Baumé and then mixing magnesium oxid with the wet flour in sufficient quantity to insure the hardening of the entire mass. I then take a suitable quantity of "xylozo" in its purest form and thoroughly bleach it and then allow it to dry to an anhydrous mass; and I then reduce to an intimate fine mixture a suitable amount of this hardened wood flour and bleached practically dry, "xylozo," together with a suitable metallic oxid and chlorid and a small percentage of gum camphor. This mixture is moistened to excess to form a "clear" semi-liquid syrupy mass and stirred occasionally during the next hour and then allowed to stand for two or three hours until chemical action sets in and the mass commences to harden, and when at a stiff plastic consistency the mass is pressed into suitable molds and allowed to dry. I preferably make all this mixture by grinding together the different ingredients to disintegrated or powdered form, the ingredients being thoroughly ground and mixed together into a very fine powdered mixture which may then be moistened to the proper consistency and treated as above described. In forming this mixture I preferably use the purest form of oxy-chlorid, so as to obtain a resulting mixture normally clear white but which may be tinted if desired.

I have found in practice that the proportions of the different ingredients may be considerably varied according to the desired use of the resulting article, but the following proportions give highly satisfactory results in the manufacture of mirror and brush backs and similar articles: approximately 50 parts by weight of bleached practically dry, "xylozo," approximately 50 parts by weight of a suitable dry metallic oxid, preferably white magnesium oxid, approximately 25 parts by weight of the chlorid of the metal and approximately 4% of gum camphor, and if desired, approximately 10 parts by weight of bleached wood flour and also, if desired, a small quantity of inert matter approximately of the same hardness as the resulting article formed, such as clean kaolin or silica.

After this disclosure of my invention, it will be obvious to those skilled in the art that certain changes and substitutions may be made in carrying out my invention without departing from the spirit thereof. For instance, if desired, the metallic chlorid may be added in the form of a solution to the mixture of the other ingredients, and if desired, any of the well known oxychlorids such as those of barium, zinc or aluminum, or any compound of the different oxy-chlorids may be used.

Articles made from my new composition in accordance with my invention may be manufactured cheaper than similar articles of celluloid, bone or ivory, and they are not inflammable as are celluloid articles.

Having thus described my invention, what I desire to secure by Letters Patent is:

1. A new composition of matter comprising sulfite cellulose liquor treated with a chloridic reagent and then with a precipitating agent adapted to precipitate therefrom sulfur and calcium compounds evaporated to a solid condition and then pulverized, a small quantity of gum camphor, and a suitable oxy-chlorid binding agent.

2. A new composition of matter comprising sulfite cellulose liquor treated with a chloridic reagent and then with a precipitating agent adapted to precipitate therefrom sulfur and calcium compounds, and from which the precipitates have been removed, dried to a solid condition and pulverized, powdered, vegetable fiber, gum camphor, and an oxy-chlorid binding agent.

3. A new composition of matter consisting of sulfite cellulose liquor which has been treated with a chloridic reagent and then with an agent for precipitating the sulfites therefrom, separated from such precipitate, dried and pulverized, powdered, indurated vegetable fiber, and a small quantity of gum camphor mixed with an oxy-chlorid binding agent.

4. The method of making a cement composition which consists in treating sulfite cellulose liquor with a chloridic reagent and then with a precipitating agent to precipitate therefrom sulfur and calcium compounds, withdrawing said liquor from said precipitates, drying said liquor to a hard residium, pulverizing said residium, and mixing therewith a small quantity of gum camphor and an oxy-chlorid agent.

5. The method of making a cement composition which consists in treating sulfite cellulose liquor with a chloridic reagent and then with a precipitating agent to precipitate therefrom sulfur and calcium compounds, withdrawing said liquor from said precipitates, drying said liquor to a hard residium, pulverizing said residium, and mixing therewith a small quantity of gum camphor and adding a powdered oxid and powdered metallic chlorid, the oxid and chlorid, being adapted when wet to unite to form an oxychlorid.

6. The method of making a cement composition which consists in treating sulfite cellulose liquor with a chloridic reagent and then with a precipitating agent to precipitate therefrom sulfur and calcium compounds, withdrawing said liquor from said precipitates, drying said liquor to a hard residium, pulverizing said residium, and mixing therewith a small quantity of gum camphor and adding powdered magnesium oxid and powdered magnesium chlorid.

In testimony whereof I affix my signature, in the presence of two subscribing witnesses.

WALTER K. FREEMAN.

Witnesses:
Jno. S. George,
Clarence W. Hodge.